(12) United States Patent
Kusaka et al.

(10) Patent No.: US 6,227,566 B1
(45) Date of Patent: May 8, 2001

(54) AIRBAG DEVICE WITH INFLATOR

(75) Inventors: Shuji Kusaka; Tadayuki Ato, both of Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/240,582

(22) Filed: Feb. 1, 1999

(30) Foreign Application Priority Data

Feb. 10, 1998 (JP) .................................................. 10-028434

(51) Int. Cl.$^7$ .................................................. B60R 21/30
(52) U.S. Cl. ...................... 280/738; 280/741; 280/728.2; 280/729
(58) Field of Search .................................... 280/741, 736, 280/728.1, 728.2, 729, 738, 739

(56) References Cited

U.S. PATENT DOCUMENTS

| 3,675,942 | | 7/1972 | Huber . |
| 3,887,213 | * | 6/1975 | Goetz .................................... 280/738 |
| 4,964,652 | | 10/1990 | Karlow . |
| 5,004,586 | * | 4/1991 | Hayashi et al. .................. 280/738 X |
| 5,058,921 | | 10/1991 | Cuevas . |
| 5,207,450 | * | 5/1993 | Pack, Jr. et al. ..................... 280/738 |
| 5,286,054 | * | 2/1994 | Cuevas ................................... 280/738 |
| 5,658,008 | * | 8/1997 | Herrmann et al. ................. 280/728.2 |
| 5,791,682 | * | 8/1998 | Hiramitsu et al. ................. 280/728.2 |

FOREIGN PATENT DOCUMENTS

| 0 280 045 | 8/1988 | (EP) . |
| 2.115.985 | 7/1972 | (FR) . |
| 2.212.799 | 7/1974 | (FR) . |

* cited by examiner

*Primary Examiner*—J. J. Swann
*Assistant Examiner*—F. Zeender
(74) *Attorney, Agent, or Firm*—Kanesaka & Takeuchi

(57) ABSTRACT

An airbag device is formed of a retainer, an outer bag having a gas inlet, an inner bag located in the outer bag, a module cover fixed to the retainer for covering the outer bag, and an inflator attached around the opening of the retainer. A periphery of the gas inlet is disposed around an opening of the retainer. The inflator includes a toroidal main body having a front side portion with a gas outlet and a rear side portion, a first flange extending from an outer periphery of the main body and fixed to the retainer, a second flange extending from an inner periphery of the main body to which the inner bag is fixed, and an air vent hole for providing a communication between the front side portion and the rear side portion. The gas from the inflator is supplied between the inner and outer bags.

3 Claims, 7 Drawing Sheets

AIRBAG DEVICE WITH INFLATOR

FIELD OF THE INVENTION AND RELATED ART STATEMENT

The present invention relates to an airbag device with an inflator installed in a vehicle. More particularly, the present invention relates to an airbag device of a so-called aspiration type, which aspirates air when an airbag is inflated with gas from an inflator.

An airbag device for protecting an occupant during a vehicle collision or roll-over is structured so that an airbag thereof is inflated by gas from an inflator. By making the device to aspirate air into the inflating airbag, the inflating speed of the airbag can be increased. An airbag of such a type which aspirates air during the inflation of the airbag is sometimes called as an aspiration-type airbag.

Most of aspiration-type airbags for drivers are structured to aspirate air through vent holes formed in the airbags. Some of aspiration-type airbags for occupants in passenger seats or rear seats use such vent holes. As one of aspiration-type airbag devices for occupants in passenger seats or rear seats, an airbag device, in which an air through opening is formed in a casing for accommodating an airbag, has been proposed.

OBJECT AND SUMMARY OF THE INVENTION

It is an object of the present invention to an air bag device with an inflator having an air vent portion for aspirating air formed in itself, not in an airbag or a casing.

An inflator of the present invention used for supplying gas into an airbag to inflate the airbag, has a gas outlet, a front-side portion confronting the airbag, and a rear-side portion opposite to the front-side portion. An air vent hole communicates between the front-side portion and the rear-side portion.

As described above, the inflator of this invention is provided with an air vent hole formed in itself, thereby avoiding the necessity of forming a hole for the aspirating air in an airbag or a casing or allowing the minimization of the hole.

DETAILED DESCRIPTION OF PREFERRED EMBODIMENT

Figure 1A:
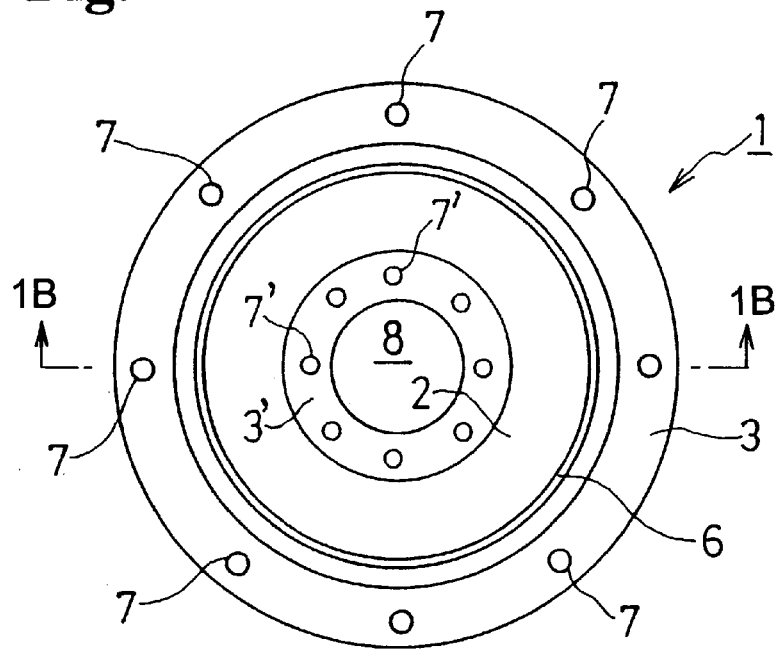
FIG. 1A is a plan view of an inflator according to an embodiment.
Figure 1B:
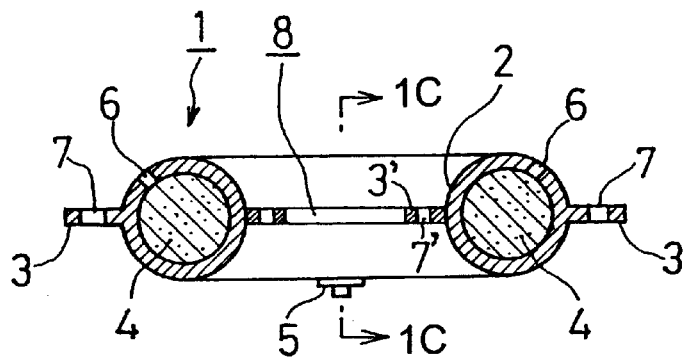
FIG. 1B is a sectional view taken along line 1B—1B in FIG. 1A.
Figure 1C:
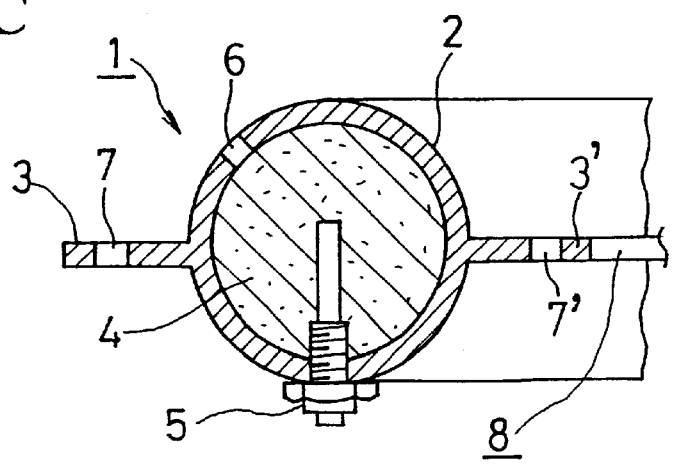
FIG. 1C is a sectional view taken along line 1C—1C in FIG. 1B.

Hereinafter, embodiments of the present invention will be described with reference to attached drawings. FIG. 1A is a plan view of an inflator according to an embodiment, FIG. 1B is a sectional view taken along line 1B—1B in FIG. 1A, and FIG. 1C is an enlarged sectional view taken along line 1C—1C of FIG. 1B.

The inflator 1 comprises a toroidal main body 2, flanges 3, 3' projecting from the outer periphery and the inner periphery of the main body 2, respectively, gas generating agent (propellant) 4 filled in the main body 2, and an igniter 5 for igniting the gas generating agent 4. The igniter 5 may be provided alone or plurally.

The main body 2, of which section is hollow circular, is provided with a gas outlet 6 formed in its front side portion. Though the gas outlet 6 is composed of a continuous slit extending all around the main body 2, it may be composed of a plurality of holes. The igniter 5 is attached to the rear side of the main body 2.

The flanges 3, 3' have through holes 7, 7' into which fasteners such as bolts or rivets are inserted for fixing the inflator 1 to a retainer or a casing of an airbag device.

In this embodiment, in FIG. 1B, the upper-side with reference to the flanges 3, 3' is the front side and the lower-side with reference to the flanges 3, 3' is the rear side. An air vent hole 8 is formed to provide communication between the front side and the rear side. That is, the flange 3' on the inner periphery is formed in a flat ring configuration of which the inner opening composes the air vent hole 8.

Figure 2A:
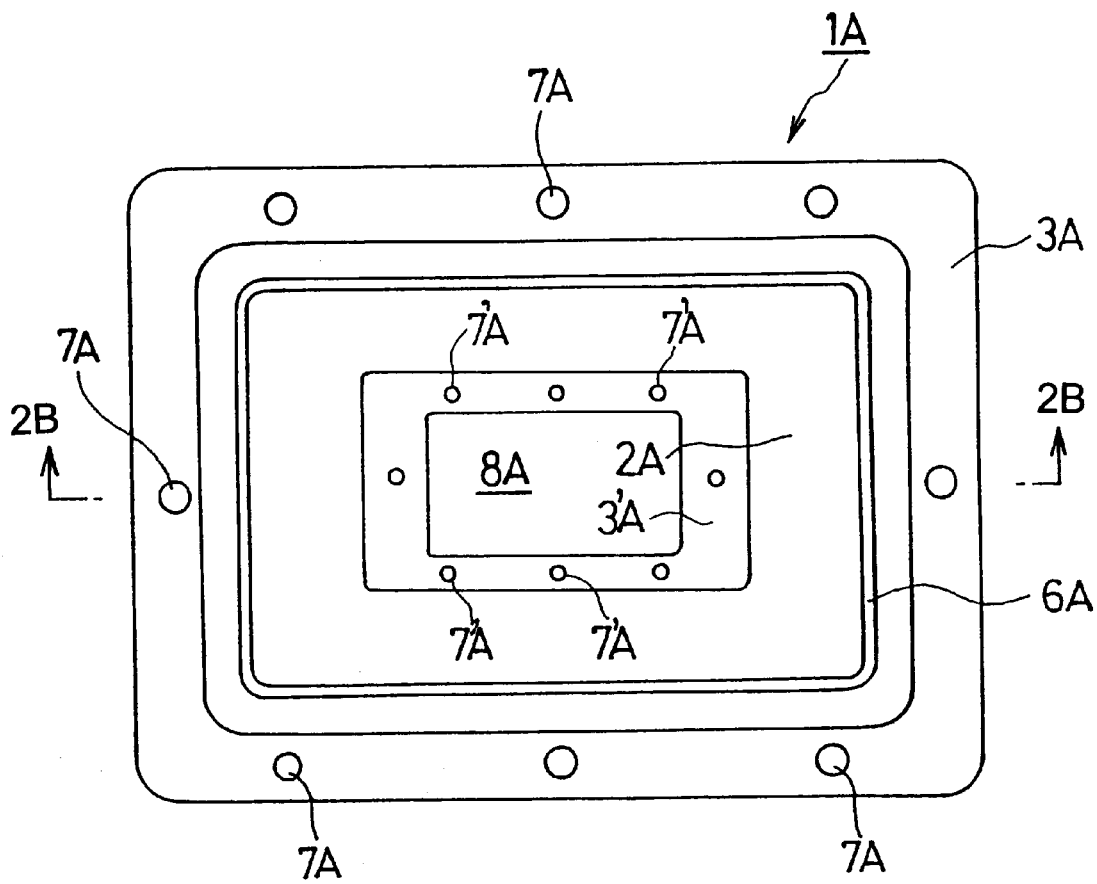
FIG. 2A is a plan view of an inflator according to another embodiment.
Figure 2B:
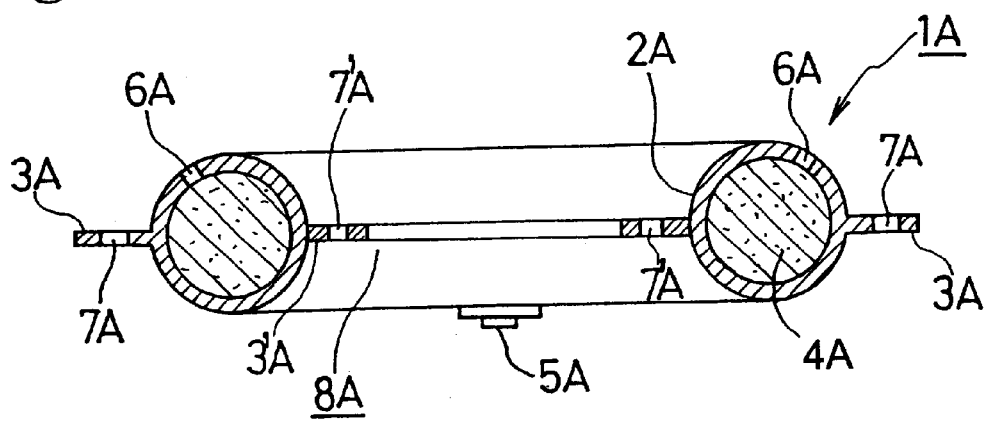
FIG. 2B is a sectional view taken along line 2B—2B in FIG. 2A.

FIGS. 2A, 2B show inflator 1A of which flanges 3A, 3'A are in rectangular ring-like configuration. The flange 3A extends from the outer periphery of the main body 2A and the flange 3'A extends from the inner periphery of the main body 2A The flange 3'A is in a flat rectangular ring-like configuration and the opening inside the ring composes the air vent hole 8A. The front side of the main body 2A is provided with a slit-like gas outlet 6A formed all around the main body 2A. The gas outlet 6A may be composed of a plurality of holes. The flange 3A is provided with through holes 7A for fasteners. The numeral 4A designates propellant and the numeral 5A designates an igniter. At least one igniter 5 is disposed on the rear side of the main body 2A.

For removing particles in the gas, a filter is disposed along the gas outlet 6, 6A, but not shown.

Figure 3:
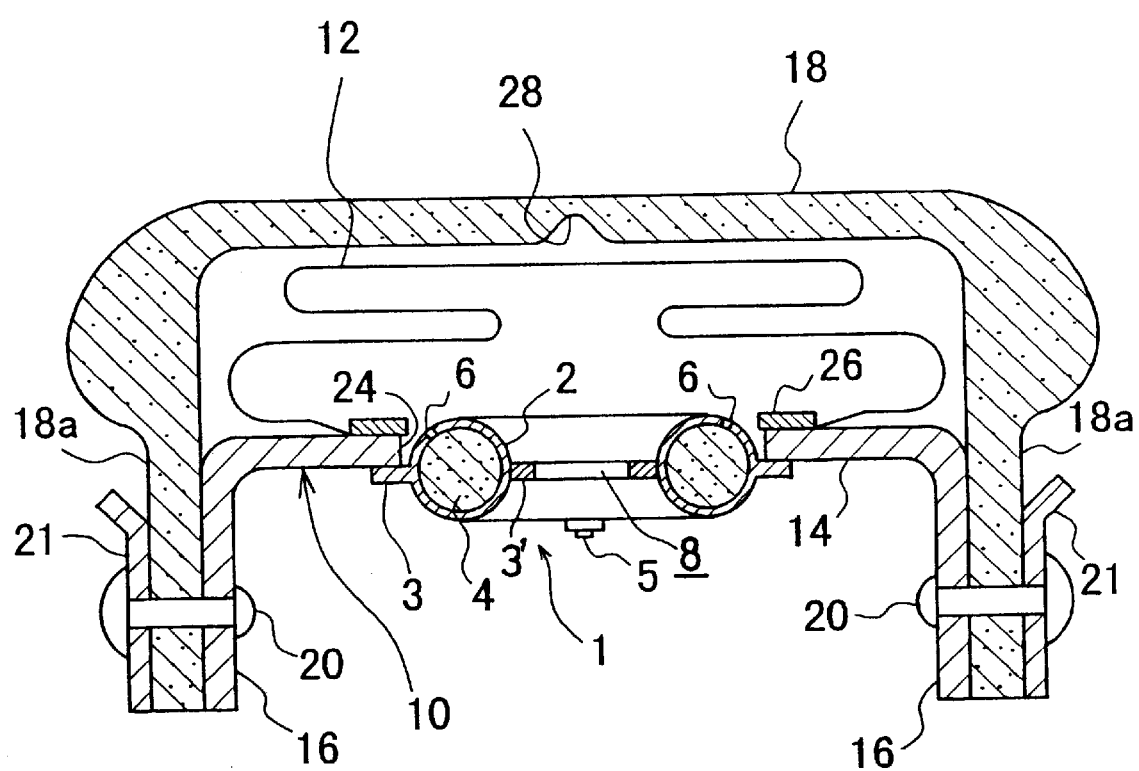
FIG. 3 is a sectional view of an airbag device according to an embodiment.
Figure 4:
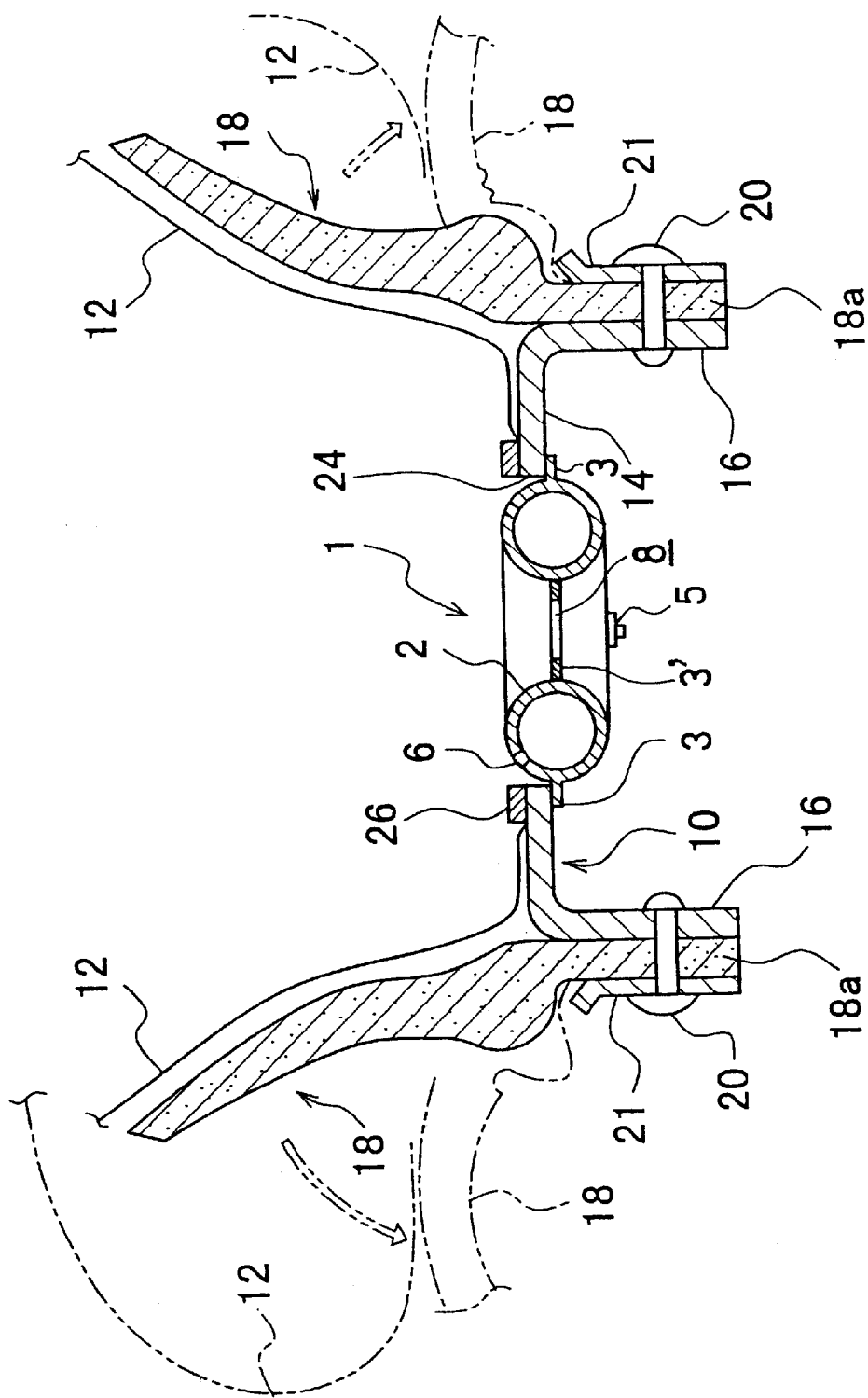
FIG. 4 is a sectional view of the airbag device of FIG. 3 in its operative state.

FIGS. 3, 4 are sectional views of a driver's airbag device having the inflator as shown in FIG. 1 or FIG. 2. FIG. 3 shows the state before the actuation of the inflator and FIG. 4 shows the state after the actuation of the inflator.

In FIGS. 3, 4, a retainer 10 comprises a flat plate portion 14, to which an airbag 12 is secured, and a module cover mounting portion composed of a standing piece 16 standing from the edge of the flat plate portion 14 in a direction opposite to an occupant. The airbag 12 is folded and covered by a module cover 18. A leg portion 18a or the proximal end of the module cover 18 is laid on the outer surface of the standing piece 16. Further, a plate 21 is laid on the outer surface of the leg portion 18a. The leg portion 18a is fixed to the retainer 10 by rivets 20 penetrating the plate 21, the leg portion 18a, and the standing piece 16.

The inflator 1 or 1A is disposed in such a manner that the upper side (front side) thereof enters in the airbag 12 through an opening 24 formed in the flat plate portion 14 and the flange 3 is fixed to the retainer 10. The numeral 26 designates an airbag fixing member called as a ring. The periphery of the opening of the airbag 12 is clamped between the ring 26 and the periphery of the opening 24 of the flat plate portion 14, thereby securing the airbag 12 to the retainer 10. The numeral 28 designates a tear line formed in the module cover 18.

In the airbag device as structured above, as the inflator 22 is actuated according to the vehicle collision, a lot of gas is rapidly injected from the inflator 22 so as to start the deployment of the airbag 12. According to the deployment of the airbag 12, the module cover 18 is torn along the tear line 28 as shown in FIG. 4 so that the airbag 12 is rapidly inflated (deployed) in the vehicle cabin.

When the airbag 12 is inflated in this manner, air is aspirated into the airbag 12 through the air vent hole 8 or 8A Therefore, even when the inflator 1 or 1A has a small capacity of generating gas, the airbag 12 is sufficiently quickly inflated. The necessity of forming a vent hole in the airbag 12 can be avoided.

When the occupant plunges into the inflated airbag 12, a part of gas in the airbag 12 is discharged through the air vent hole 8 or 8A, thereby softening the impact acting on the occupant.

Figure 5:
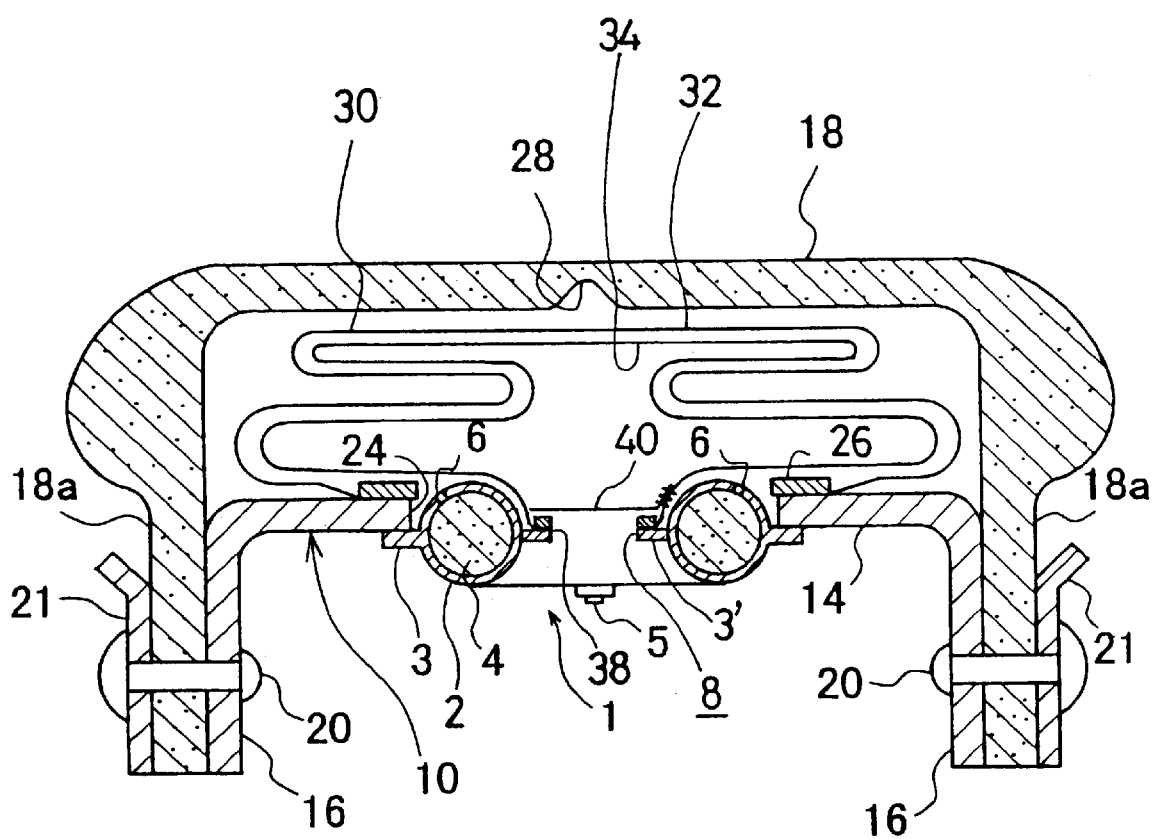
FIG. 5 is a sectional view of an airbag device according to another embodiment.
Figure 6:
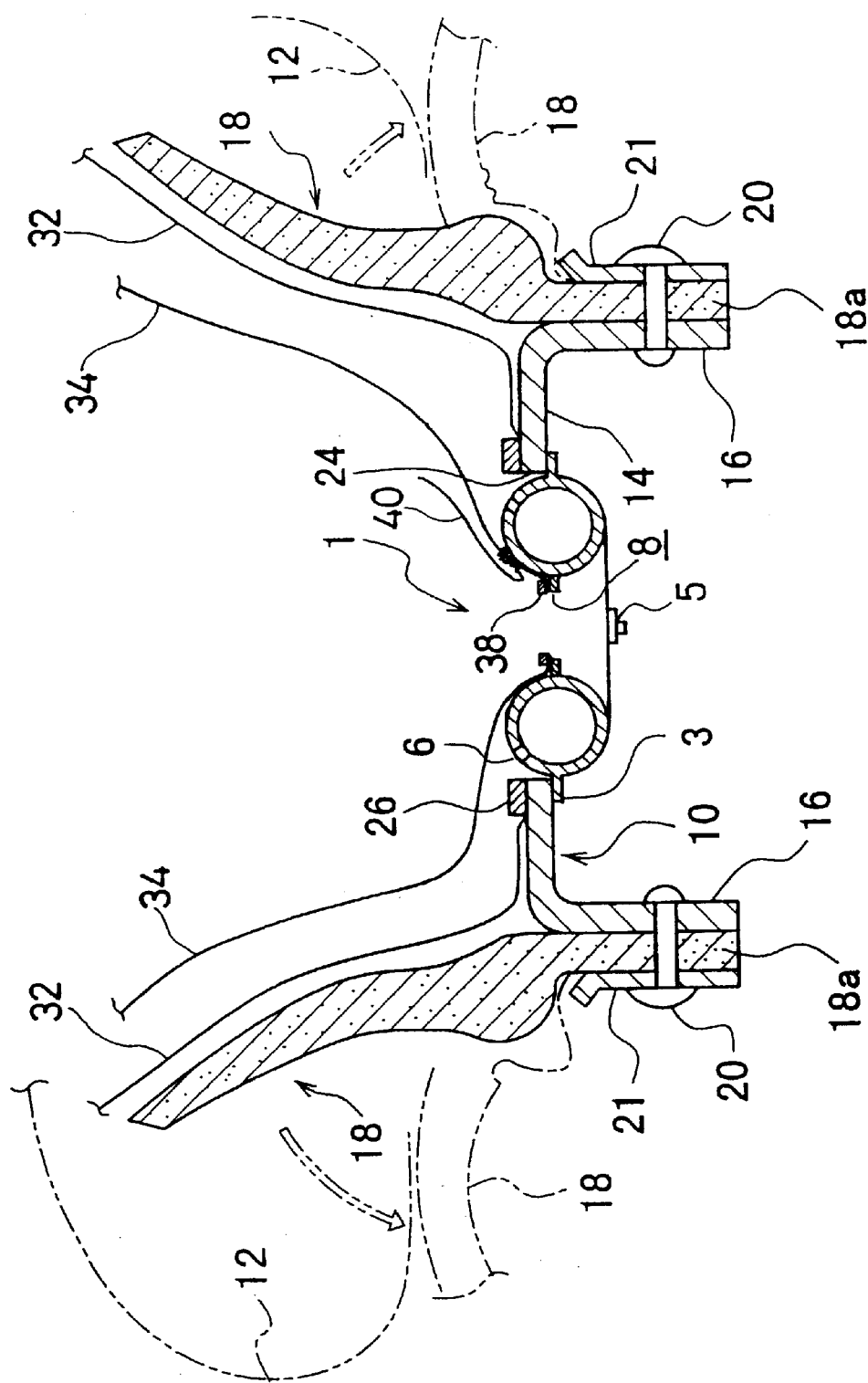
FIG. 6 is an enlarged sectional view of the airbag device of FIG. 5 in its operative state.
Figure 7:
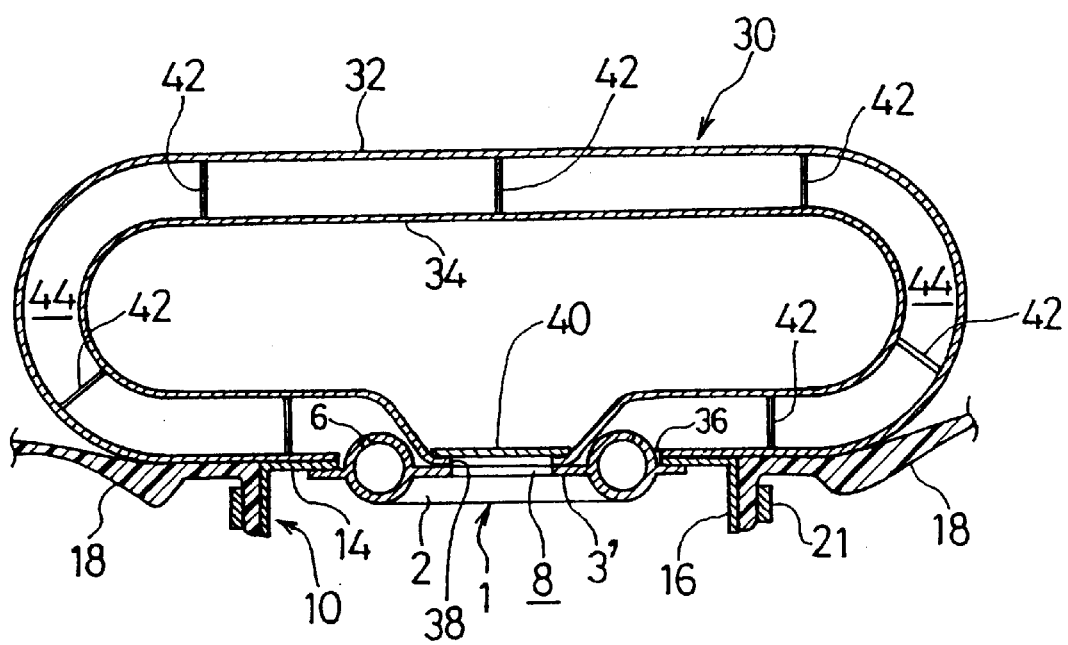
FIG. 7 is a general sectional view of the device of FIG. 6 in its operative state.

FIG. 5 is a sectional view of the airbag device employing a dual airbag, FIG. 6 is a sectional view of the airbag in the process of inflation, and FIG. 7 is a sectional view of the airbag after completion of the inflation. The airbag 30 has an outer bag 32 and an inner bag 34. The outer bag 32 is provided with an opening 36, through which the inflator is inserted, formed therein. The inner bag 34 is provided with an opening 38 formed therein for introducing (aspirating) air. The opening 38 has a lid 40 of a fabric piece. The outer bag 32 and the inner bag 34 are connected to each other by connecting strips 42 such as cords or fabric strips.

The periphery of the opening 38 of the inner airbag 34 is secured to the flange 3' on the inner periphery of the inflator 1 using a ring. The periphery of the opening 36 of the outer airbag 32 is secured to the retainer 10 using the ring 26.

The other structure of the airbag device is the same as that of the embodiment of FIGS. 3, 4 and the same numerals designate parts similar or corresponding to the parts of the embodiment of FIGS. 3, 4.

When the inflator 1 (or 1A) is actuated to inject gas, the inflator 1 (or 1A) injects gas through the gas outlet 6 in such a manner that the gas enters into a space between the outer bag 32 and the inner bag 34, thereby inflating the outer bag 32.

According to the inflation of the outer bag 32, the inner bag 34 is also inflated. During this, air is aspirated into the inner bag 34 through the opening 38.

Therefore, in the airbag device shown in FIG. 5, the amount of gas that should be injected by the inflator 1 (or 1A) is only an amount of gas necessary to fill the space between the outer bag 32 and the inner bag 34. Consequently, an inflator, capacity of injecting gas being significantly small, can be employed as the inflator 1 or 1A.

Though the inflator 1 or 1A is circular or rectangular in the above embodiments, it may be elliptic, rhomboid, or polygonal such as hexagon or octagon.

Though FIGS. 3 through 5 relate to a driver's airbag device, the inflator of this invention can be employed as an inflator used in an airbag device for an occupant in a passenger seat or a rear seat, used in a side airbag device disposed at a side of an occupant, or used in an airbag device for protecting the head of an occupant.

As described above, the inflator of this invention has an air vent hole, thereby avoiding the necessity of forming a hole for the aspiration in an airbag or a casing or allowing the minimization of the hole. The airbag device of this invention is provided with this inflator, thereby sufficiently functioning with the inflator of small gas generating capacity.

What is claimed is:

1. An airbag device comprising:

a retainer having a front surface, a rear surface and an opening, an outer bag having a gas inlet, a periphery of the gas inlet being disposed around the opening of the retainer, an inner bag located in the outer bag, a module cover fixed to the retainer for covering the outer bag, and an inflator attached around the opening of the retainer and including a toroidal main body having a front side portion and a rear side portion, said front side portion having a gas outlet and confronting the outer and inner bags, a first flange extending from an outer periphery of the main body and fixed to the retainer, a second flange extending from an inner periphery of the main body to which said inner bag is fixed, and an air vent hole for providing a communication between the front side portion and the rear side portion.

2. An airbag device according to claim 1, wherein said gas outlet is located between the inner and outer bags to provide gas of the inflator therebetween.

3. An airbag device according to claim 2, wherein said gas outlet extends continuously throughout the entire front side portion.

* * * * *